(12) United States Patent
Guzik et al.

(10) Patent No.: US 11,606,111 B2
(45) Date of Patent: Mar. 14, 2023

(54) ADAPTIVE POWER AND COMMUNICATION ROUTING FOR BODY-WORN DEVICES

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

(21) Appl. No.: 17/331,563

(22) Filed: May 26, 2021

(65) Prior Publication Data
US 2022/0385325 A1    Dec. 1, 2022

(51) Int. Cl.
H04M 11/00 (2006.01)
H04B 1/3827 (2015.01)
H04B 3/54 (2006.01)
H04W 4/38 (2018.01)
H04W 84/18 (2009.01)

(52) U.S. Cl.
CPC ............. H04B 1/385 (2013.01); H04B 3/54 (2013.01); H04W 4/38 (2018.02); *H04W 84/18* (2013.01)

(58) Field of Classification Search
CPC .......... H04B 1/385; H04B 3/54; H04W 4/38; H04W 84/18
USPC ....................................................... 455/403
See application file for complete search history.

(56) References Cited

U.S. PATENT DOCUMENTS

| 3,530,451 A | 9/1970 | Devine |
| 5,108,019 A | 4/1992 | Woodward et al. |
| 5,479,149 A | 12/1995 | Pike |
| 5,525,966 A | 6/1996 | Parish |

(Continued)

FOREIGN PATENT DOCUMENTS

KR    102067905 B1    1/2020

OTHER PUBLICATIONS

Cloud Connected Guns For Cops that can Recognize Shots & Alert Backup in Realtime, Linus Tech Tips, Messageboard User Tech_Dreamer, Oct. 24, 2014. URL: https://linustechtips.com/topic/238322-cloud-connected-guns-for-cops-that-can-recognize-shots-alert-backup-in-realtime/.

(Continued)

*Primary Examiner* — Tanmay K Shah
(74) *Attorney, Agent, or Firm* — Han Santos, PLLC

(57) ABSTRACT

A body-worn hub may detect that a first battery charge level of a first battery in a body-worn device connected to the body-worn hub via a wired connection is at or below a first battery charge level threshold. Accordingly, the body-worn hub may route power from the body-worn hub to the body-worn device via the wired connection to charge the first battery when a second battery charge level of a second battery in the body-worn hub is above a second battery charge level threshold. However, in response to the first battery of the body-worn device being charged to a third battery charge level that is above the first battery charge level threshold or the second battery charge level dropping to the second battery charge level threshold, the body-worn hub may stop routing power to the body-worn device via the wired connection.

20 Claims, 6 Drawing Sheets

(56) References Cited

U.S. PATENT DOCUMENTS

| | | | |
|---|---|---|---|
| 5,828,301 A | 10/1998 | Sanchez | |
| 5,914,585 A * | 6/1999 | Grabon | G06F 1/263 307/64 |
| 5,991,844 A | 11/1999 | Khosrowpour | |
| 6,563,424 B1 | 5/2003 | Kaario | |
| 7,409,557 B2 | 8/2008 | Teppler | |
| 7,843,329 B2 | 11/2010 | Shigemori | |
| 7,969,963 B2 | 6/2011 | Duan et al. | |
| 8,719,452 B1 | 5/2014 | Ding et al. | |
| 9,124,258 B2 | 9/2015 | Pechaud et al. | |
| 9,395,432 B2 | 7/2016 | Boyd | |
| 9,564,043 B2 | 2/2017 | Sanders et al. | |
| 9,742,221 B2 * | 8/2017 | Shinohara | H02J 50/40 |
| 9,810,766 B2 | 11/2017 | Boyd | |
| 9,829,343 B2 | 11/2017 | Sobotka et al. | |
| 10,370,102 B2 | 8/2019 | Boykin et al. | |
| 10,403,124 B1 | 9/2019 | Schuler et al. | |
| 10,673,883 B2 | 6/2020 | Wetterwald et al. | |
| 11,378,355 B1 | 7/2022 | Howard | |
| 11,442,173 B2 | 9/2022 | Kim et al. | |
| 11,457,172 B2 | 9/2022 | Takahashi et al. | |
| 2003/0095032 A1 | 5/2003 | Hoshino et al. | |
| 2004/0167990 A1 | 8/2004 | Peer | |
| 2005/0066567 A1 | 3/2005 | Newkirk et al. | |
| 2005/0229654 A1 | 10/2005 | Victor | |
| 2006/0056560 A1 | 3/2006 | Aweya et al. | |
| 2006/0056563 A1 | 3/2006 | Aweya et al. | |
| 2007/0124979 A1 | 6/2007 | Newkirk et al. | |
| 2008/0204231 A1 | 8/2008 | Hietanen et al. | |
| 2010/0172339 A1 | 7/2010 | Duan et al. | |
| 2010/0284683 A1 | 11/2010 | Fressola et al. | |
| 2012/0304634 A1 * | 12/2012 | Ooi | F02D 31/001 60/423 |
| 2013/0076398 A1 | 3/2013 | Pechaud et al. | |
| 2013/0138991 A1 | 5/2013 | Reinke et al. | |
| 2014/0129174 A1 | 5/2014 | White et al. | |
| 2015/0242608 A1 | 8/2015 | Kim et al. | |
| 2015/0254968 A1 | 9/2015 | Sanders et al. | |
| 2016/0086472 A1 | 3/2016 | Herrera et al. | |
| 2016/0100758 A1 | 4/2016 | Jeong | |
| 2016/0110975 A1 | 4/2016 | Oppenheimer | |
| 2016/0190859 A1 | 6/2016 | Blum et al. | |
| 2017/0003101 A1 | 1/2017 | Madrid et al. | |
| 2017/0010062 A1 | 1/2017 | Black et al. | |
| 2017/0059274 A1 | 3/2017 | Crist et al. | |
| 2017/0074617 A1 | 3/2017 | Stewart et al. | |
| 2017/0160050 A1 | 6/2017 | Alfaro | |
| 2017/0180536 A1 | 6/2017 | Stock et al. | |
| 2018/0050800 A1 | 2/2018 | Boykin et al. | |
| 2018/0070840 A1 | 3/2018 | Cronin et al. | |
| 2018/0231349 A1 | 8/2018 | Wagner et al. | |
| 2019/0033043 A1 | 1/2019 | Piccioni | |
| 2019/0268526 A1 | 8/2019 | Sosnovsky et al. | |
| 2020/0003511 A1 | 1/2020 | Deng et al. | |
| 2020/0019682 A1 | 1/2020 | Lee et al. | |
| 2020/0027458 A1 * | 1/2020 | Torok | G06F 3/167 |
| 2020/0217613 A1 | 7/2020 | Hatcher et al. | |
| 2020/0370863 A1 | 11/2020 | Wagner et al. | |
| 2021/0005850 A1 * | 1/2021 | Thiel | H01M 50/116 |
| 2021/0080208 A1 | 3/2021 | Wu et al. | |
| 2021/0088297 A1 | 3/2021 | Henry | |
| 2021/0132177 A1 | 5/2021 | Srinivas et al. | |
| 2021/0203168 A1 * | 7/2021 | Sharma | H01M 10/48 |
| 2022/0101702 A1 | 3/2022 | Olsen | |
| 2022/0110504 A1 | 4/2022 | Inglis | |
| 2022/0295437 A1 | 9/2022 | Maluf et al. | |
| 2022/0318095 A1 | 10/2022 | Gautam et al. | |

OTHER PUBLICATIONS

Miners, Zach. Startup arms cops with Internet-connected 'smart' guns, PC World, Oct. 27, 2014. URL: https://www.pcworld.com/article/2839581/startup-arms-cops-with-internetconnected-smart-guns.html.

Szondy, David. Wireless Yardarm Sensor monitors firearm use in real time, New Atlas, Oct. 27, 2014. URL: https://newatlas.com/yardarm-sensor-firearms/34409/.

Yardarm. Mar. 2021. URL: http://www.yardarmtech.com.

International Patent Application No. PCT/US2022/031647, International Search Report and Written Opinion dated Sep. 28, 2022, 10 pages.

U.S. Appl. No. 17/354,835, Office Action dated Oct. 25, 2022, 38 pages.

U.S. Appl. No. 17/336,954 Office Action dated Nov. 21, 2022, 30 pages.

* cited by examiner

ADAPTIVE POWER AND COMMUNICATION ROUTING FOR BODY-WORN DEVICES

BACKGROUND

Law enforcement officers generally carry multiple body-worn electronic devices as they perform their law enforcement functions. For example, law enforcement agencies are increasingly mandating that their police officers carry and use portable recording devices to record their interactions with the public. The recordings may serve to protect the public from improper policing, as well as protect law enforcement officers from false allegations of police misconduct. Other examples of electronic devices that are carried by a law enforcement officer may include a radio, a smartphone, a biometric monitor, a non-lethal electronic shock weapon, and electronic add-on sensors for the officer's primary weapon, i.e., a gun. The add-on sensors may include a sensor that detects the unholster of an officer's gun from its holster or a sensor that detects the firing of the officer's gun. While these electronic devices are designed to aid the officer in performing his or her duties in protecting and serving the public, they are often configured to be self-powered and work independently of one another.

SUMMARY

Described herein are techniques for using a body-worn hub to adaptively power the various body-worn devices that are typically worn by a law enforcement officer while on duty. Such body-worn devices may include a body camera, a radio, a smartphone, a biometric monitor, a non-lethal electronic shock weapon, electronic add-on sensors for the officer's primary weapon, and/or so forth. The body-worn hub may include a built-in battery, power distribution components, data processing components, short-range wireless communication components, long-range wireless communication components, physical interface components, and/or so forth. In some instances, the body-worn hub may be a standalone device that is worn on the body of the law enforcement officer. In other instances, the body-worn hub may be integrated into another garment or another piece of equipment already worn by the law enforcement officer, such as a ballistic vest, a body camera, etc. Each set of components may include hardware components, software components, or a combination of software and hardware components. The short-range wireless communication components may enable the body-worn hub to exchange communications with the various body-worn devices via short-range wireless communication, such as Bluetooth, ultra-wide band (UWB), or Wi-Fi, as well as exchange communications with a remote hub, such as a hub in a law enforcement vehicle of the officer or a hub associated with another law enforcement officer. The long-range wireless communication components may enable the body-worn hub to exchange communications with a computing device at a network operations center (NOC) via long-range wireless communication, such as cellular or satellite communication.

The physical interface components may be configured to enable the body-worn hub to be physically connected to one or more body-worn devices via one or more corresponding electrically conductive wired connections. For example, the physical interface components of the body-worn hub may include electrically conductive coupling ports, and each of the body-worn devices may be similarly equipped with electrically conductive coupling ports. In this way, an electrically conductive wired connection may be made between the body-worn hub and a body-worn device using one or more electrical wires or cables that can be removably plugged into the electrically conductive coupling ports. The electrically conductive wired connections may enable the body-worn hub to send electrical power from its built-in battery to the one or more body-worn devices that are physically connected to the body-worn hub, route electrical power from one physically connected body-worn device to another physically connected body-worn device, and/or so forth. The electrically conductive wired connections may further enable the body-worn hub to exchange communications with the one or more physically connected body-worn devices without the use of wireless communication.

In some instances, the body-worn hub may be configured such that the hub will automatically stop using wireless communication with a body-worn device and default to using wired communication when an electrically conductive wired connection is made between the body-worn hub and the body-worn device. However, when the electrically conductive wired connection between the body-worn hub and the body-worn device is disconnected, the body-worn hub may automatically switch to using wireless communication with the body-worn device.

Additionally, the body-worn hub may use the data processing components to process at least one event notification that the body-worn hub receives from one or more body-worn devices to determine whether to trigger the performance of actions by at least one body-worn device. In some embodiments, the data processing component may include a software event handler that processes event notifications and generates commands for the connected body-worn devices. For example, the body-worn hub may trigger a body camera of a law enforcement officer to start a video recording when the body-worn hub is notified by a gun sensor that the officer's gun is unholstered. Further, the body-worn hub may use short-range wireless communication and/or long-range wireless communication to exchange data with another hub or a computing device of the NOC. For example, the body-worn hub may send event notifications of events that are detected by the body-worn devices to another hub or the NOC. In return, the body-worn hub may receive commands to trigger one or more of the body-worn devices to perform certain actions.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
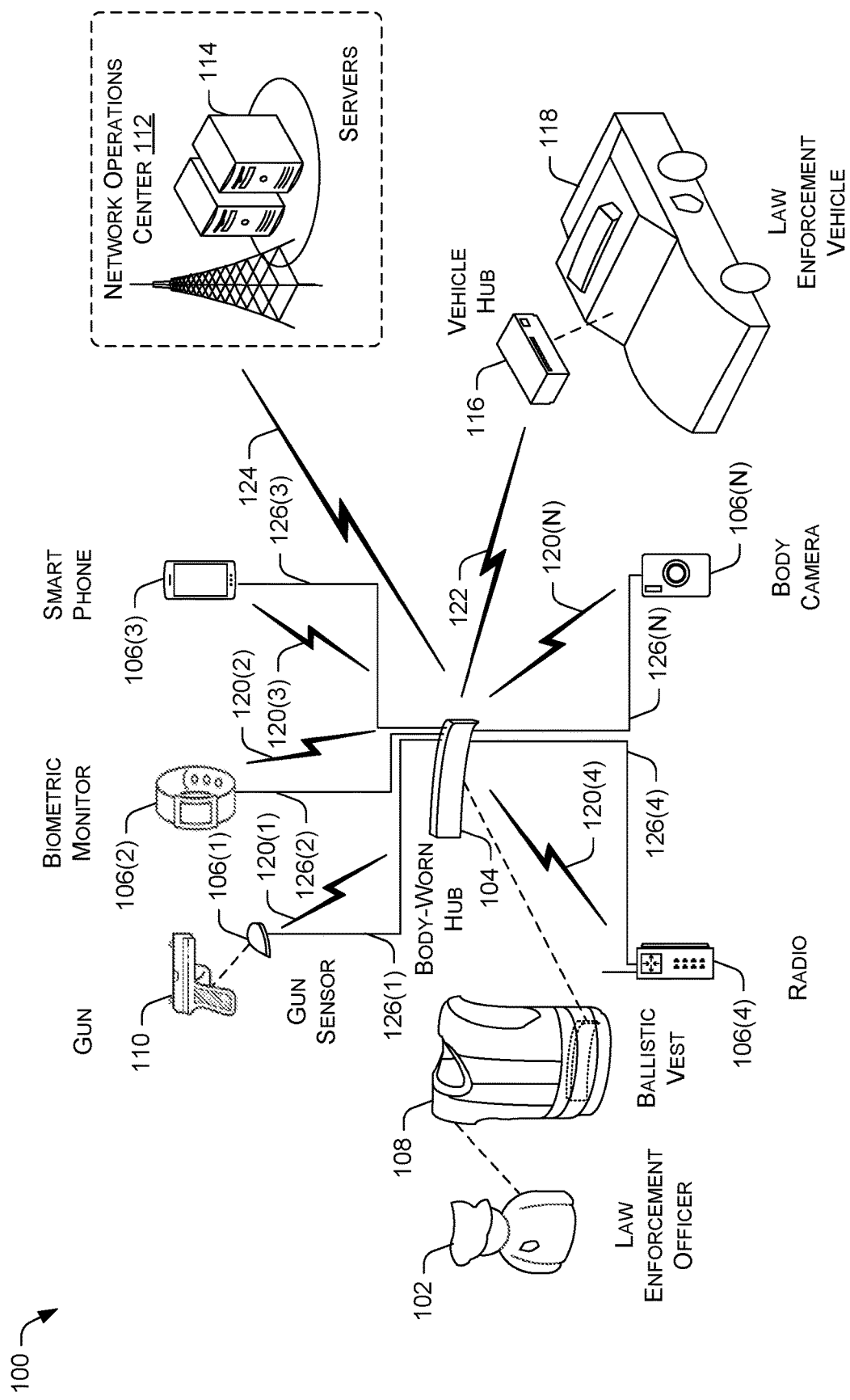
FIG. 1 illustrates an example environment for implementing a body-worn hub that provides adaptive power and communication routing for body-worn devices.

Described herein are techniques for using a body-worn hub to adaptively power the various body-worn devices that are typically worn by a law enforcement officer while on duty. Such body-worn devices may include a body camera, a radio, a smartphone, a biometric monitor, a non-lethal electronic shock weapon, a smart vehicle, electronic add-on sensors for the officer's primary weapon, and/or so forth. The body-worn hub may include a built-in battery, short-range wireless communication components, long-range wireless communication components, physical interface components, power distribution components, data processing components, and/or so forth. In some instances, the body-worn hub may be a standalone device that is worn on the body of the law enforcement officer. In other instances, the body-worn hub may be integrated into another garment or another piece of equipment already worn by the law enforcement officer, such as a ballistic vest, a body camera, etc. Each set of components may include hardware components, software components, or a combination of software and hardware components. The short-range wireless communication components may enable the body-worn hub to exchange communications with the various body-worn devices via short-range wireless communication, such as Bluetooth, UWB, or Wi-Fi, as well as exchange communication with a remote hub, such as a hub in a law enforcement vehicle. The long-range wireless communication components may enable the body-worn hub to exchange communication with a computing device at a network operations center (NOC) via long-range wireless communication, such as cellular or satellite communication.

The physical interface components may be configured to enable the body-worn hub to be physically connected to one or more body-worn devices via one or more corresponding electrically conductive wired connections. For example, the physical interface components of the body-worn hub may include electrically conductive coupling ports, and each of the body-worn devices may be similarly equipped with electrically conductive coupling ports. In this way, an electrically conductive wired connection may be made between the body-worn hub and a body-worn device using one or more electrical wires or cables that can be removably plugged into the electrically conductive coupling ports. The electrically conductive wired connections may enable the body-worn hub to send electrical power from its built-in battery to the one or more body-worn devices that are physically connected to the body-worn hub, route electrical power from one physically connected body-worn device to another physically connected body-worn device, and/or so forth. The electrically conductive wired connections may further enable the body-worn hub to exchange communications with the one or more physically connected body-worn devices without the use of wireless communication.

In some instances, the body-worn hub may be configured such that the hub will automatically stop using wireless communication with a body-worn device and default to using wired communication when an electrically conductive wired connection is made between the body-worn hub and the body-worn device. However, when the electrically conductive wired connection between the body-worn hub and the body-worn device is disconnected, the body-worn hub may automatically switch to using wireless communication with the body-worn device.

Additionally, the body-worn hub may use the data processing components to process at least one event notification that the body-worn hub receives from one or more body-worn devices to determine whether to trigger the performance of actions by at least one body-worn device. In some embodiments, the data processing component may include a software event handler that processes event notifications and generates commands for the connected body-worn devices. For example, the body-worn hub may trigger a body camera of a law enforcement officer to start a video recording when the body-worn hub is notified by a gun sensor that the officer's gun is unholstered. Further, the body-worn hub may use short-range wireless communication and/or long-range wireless communication to exchange data with another hub or a computing device of the NOC. For example, the body-worn hub may send event notifications of events that are detected by the body-worn devices to another hub or the NOC. In return, the body-worn hub may receive commands to trigger one or more of the body-worn devices to perform certain actions.

In at least one embodiment, a body-worn hub may detect that a first battery charge level of a first battery in a body-worn device connected to the body-worn hub via a wired connection is below a first battery charge level threshold. Accordingly, the body-worn hub may route power from the body-worn hub to the body-worn device via the wired connection to charge the first battery when a second battery charge level of a second battery in the body-worn hub is above a second battery charge level threshold. However, in response to the first battery of the body-worn device being charged to a third battery charge level that is above the first battery charge level threshold, or the second battery charge level dropping to the second battery charge level threshold, the body-worn hub may stop routing power to the body-worn device via the wired connection.

In other embodiments, a body-worn hub may detect that a battery charge level of a battery in a body-worn device connected to the body-worn hub via a wired connection is at or below a battery charge level threshold. When an additional battery charge level of an additional body-worn device connected to the body-worn hub via a wired connection is sufficient to charge the battery in the body-worn device, the body-worn device may route power from the additional body-worn device to the body-worn device via the body-worn hub to charge the battery in the body-worn device. However, when the additional battery charge level of the additional body-worn device is insufficient to charge the battery of the body-worn device, the body-worn hub may route power from multiple body-worn devices that are connected to the body-worn hub via multiple wired connections to the body-worn device to charge the battery in the body-worn device, provided that the battery charge levels of the multiple body-worn devices are sufficient to charge the battery of the body-worn device.

In additional embodiments, a body-worn hub and a body-worn device may exchange communication via a short-range wireless connection established using a first short-range wireless transceiver of the body-worn hub and a second short-range wireless transceiver of the body-worn device. The short-range wireless connection between the body-worn hub and the body-worn device may be terminated when a wired connection is established between the body-worn hub and the body-worn device. Subsequently, one or more event notifications from the body-worn device may be received at the body-worn hub via the wired connection. Further, the body-worn hub may send one or more commands to the body-worn device via the wired connection to trigger the body-worn device to perform one or more actions. However, the short-range wireless connection between the body-worn hub and the body-worn device may be reestablished when the wired connection between the body-worn hub and the body-worn device is terminated.

A body-worn hub may serve as a centralized communication and power node for various body-worn devices. The use of the body-worn hub by a law enforcement officer may provide a reliable and adaptive source of battery power to body-worn devices that are carried by the officer that is beyond the battery power capacities of the individual body-worn devices. Such a reliable and adaptive source of additional battery power may provide battery power redundancy that minimizes the chance of device failure due to battery depletion at critical times. The ability of the body-worn hub to provide wired communications connections to the body-worn devices and act as a central nexus for wireless communications with other hubs and the NOC may reduce or eliminate power consumed by the body-worn devices to maintain wireless communication connections with each other as well as remote devices. Example implementations are provided below with reference to FIGS. 1-6.

Example Environment

FIG. 1 illustrates an example environment 100 for implementing a body-worn hub that provides adaptive power and communication routing for body-worn devices. The environment 100 may include a law enforcement officer 102 that is equipped with a body-worn hub 104 and multiple body-worn devices 106(1)-106(N). In some embodiments, the body-worn hub 104 may be a standalone device that is worn by the law enforcement officer 102. In other embodiments, the body-worn hub 104 may be integrated into a garment or a piece of equipment that is worn by the law enforcement officer 102. For example, the body-worn hub 104 may be integrated into a ballistic vest 108 that is worn by the law enforcement officer 102. The body-worn device 106(1)-106(N) may include various devices that are carried by the law enforcement officer 102. For example, the body-worn device 106(1) may be a gun sensor that is attached to a gun 110 or a holster for the gun 110, such that the gun sensor may detect whether the gun 110 is holstered unholstered, cocked, decocked, fired, misfired, dropped, and/or so forth. The body-worn device 106(2) may be a biometric monitor (e.g., a smartwatch) that monitors the vital signs of the law enforcement officer 102, such as body temperature, blood pressure, heart rate, etc. The body-worn device 106(3) may be a smartphone that is carried by the law enforcement officer 102. The body-worn device 106(4) may be a radio that the law enforcement officer 102 uses to communicate with a network operations center (NOC) 112. The NOC 112 may include servers 114 that implement a computer-assisted dispatch platform, a data processing platform, and a data file storage platform. For example, the NOC 112 may be a part of a police station or an emergency assistance dispatch center. The servers 114 may be physical servers located at the NOC 112 or virtual servers that are implemented in a cloud. The body-worn device 106(N) may be a body camera that is capable of capturing audiovisual recording, e.g., video, of scenes and events encountered by the law enforcement officer 102.

Each of the body-worn devices 106(1)-106(N) may have short-range wireless communication capabilities, such as Bluetooth, UWB, Wi-Fi, etc., and/or long-range wireless communication capabilities, such as cellular, satellite, etc. In some instances, a body-worn device may be capable of using the short-range wireless communication capabilities to communicate with another body-worn device or a hub, such as the body-worn hub 104. In other instances, a body-worn device may be capable of using the long-range wireless communication capabilities to communicate with the hub or the servers 114 of the NOC 112. Additionally, each of the body-worn devices 106(1)-106(N) may be equipped with an electrically conductive coupling port that enables the device to send power to and receive power from another device, as well as exchange communication with another device. For example, the electrically conductive coupling port may be a mating receptacle that is configured to accept a mating plug of an electrically conductive wired connector, in which the wired connector includes a set of one or more electrically conductive wires or cables sufficient to complete an electrical circuit between two devices. However, in other implementations, the mating receptacle and plug may be substituted with other detachable electrical connection mechanisms, such as a magnetic connection mechanism. In some embodiments, the body-worn device may use the electrically conductive coupling port to send and receive communication that is encoded using digital and/or analog signals.

The body-worn hub 104 may have similar short-range and long-range wireless communication capabilities. In some instances, the body-worn hub 104 may be capable of using the short-range wireless communication capabilities to communicate with another body-worn device or a remote hub, such as the vehicle hub 116 in the law enforcement vehicle 118. For instance, the body-worn hub 104 may establish short-range wireless communication links 120(1)-120(N) with the body-worn devices 106(1)-106(N), respectively. The body-worn devices 106(1)-106(N) and the body-worn hub 104 may use the short-range wireless communications links 120(1)-120(N) to exchange communication. For example, the body-worn devices 106(1)-106(N) may use the short-range wireless communications links 120(1)-120(N) to send event notifications of events detected or recorded by the sensors of the body-worn devices 106(1)-106(N) to the body-worn hub 104. Conversely, the body-worn hub 104 may use the short-range wireless communications links 120(1)-120(N) to send commands to the body-worn devices 106(1)-106(N) that trigger one or more of the body-worn devices 106(1)-106(N) to perform one or more actions in response to events that are detected.

As examples, the events that are detected or recorded by the sensors may include the gun sensor 106(1) detecting that a gun 110 of the law enforcement officer 102 is unholstered or holstered, an accelerometer in the smartphone 106(3) detecting that the officer is running, walking, or remaining still for a predetermined time period, the biometric monitor 106(2) detecting that the heart rate of law enforcement officer 102 exceeding or falling below a predetermined rate threshold, an impact sensor in the ballistic vest 108 detecting an impact, and/or so forth. Thus, the events that are detected may include discrete events, such as a gun being unholstered or holstered, or a series of continuous events, such as a series of heart rate readings or body temperature readings. Further, the event notification for an event may include one or more predetermined encoded values that correspond to the occurrence of the event. The event notification for an event may also include the sensor data that are captured by sensor of a body-worn device for the event. For example, the sensor data may include audio data, video data, multimedia data, and/or so forth.

In another instance, the body-worn hub 104 may establish a short-range wireless communication link 122 with the vehicle hub 116, so that communications may be exchanged between the body-worn hub 104 and the vehicle hub 116. For example, the body-worn hub 104 may use the short-range wireless communication link 122 to send event notifications of events detected or recorded by the sensors of the body-worn devices 106(1)-106(N) to the vehicle hub 116, such as for data processing and/or backup purposes. Conversely, the vehicle hub 116 may use the short-range wireless communication link 122 to send commands to the body-worn hub 104. The commands may trigger one or more of the body-worn devices 106(1)-106(N) that are connected to the body-worn hub 104 to perform one or more actions in response to events that are detected. In other instances, the body-worn hub 104 may be capable of using the long-range wireless communication capabilities to communicate with a remote hub, such as the vehicle hub 116, or the servers 114 of the NOC 112. For instance, the body-worn hub 104 may establish a long-range wireless communication link 124 with the servers 114 of the NOC 112. In such an instance, the long-range wireless communication link 124 may be used by the body-worn hub 104 to send event notifications of events detected or recorded by the sensors of the body-worn devices 106(1)-106(N) to the servers 114 of the NOC 112. Conversely, the servers 114 may use the long-range wireless communication link 124 to send commands to the body-worn hub 104. The commands may trigger one or more of the body-worn devices 106(1)-106(N) that are connected to the body-worn hub 104 to perform one or more actions in response to events that are detected.

Additionally, the body-worn hub 104 may be equipped with a set of electrically conductive coupling ports that are similar to those featured on the body-worn devices 106(1)-106(N), in which a coupling port is a receptacle that may accept the mating plug of an electrically conductive wired connector that connects the body-worn hub to a body-worn device. However, in other implementations, the set of mating receptacles and plugs may be substituted with other detachable connection mechanisms, such as a magnetic connection mechanism. In this way, the body-worn hub 104 may send power to and receive power from the body-worn devices 106(1)-106(N), as well as exchange communication with the body-worn devices 106(1)-106(N). For example, the body-worn hub 104 may be connected to the body-worn devices 106(1)-106(N) via respective electrically conductive wired connectors 126(1)-126(N).

In some embodiments, the wired connections between the body-worn hub 104 and the body-worn devices 106(1)-106(N) may enable the hub to send electrical power from its built-in battery to one or more of the body-worn devices 106(1)-106(N). For example, the body-worn hub 104 may detect via the wired connector 126(N) that a battery charge level of the body camera 106(N) has dropped to a critical battery level threshold. Accordingly, the body-worn hub 104 may send electrical power to the body camera 106(N) via the wired connector 126(N) to charge the battery of the body camera 106(N). In other embodiments, the body-worn hub 104 may be configured to use the wired connections to route electrical power from one body-worn device to another body-worn device. For example, the body-worn hub 104 may detect via the wired connector 126(2) that a battery charge level of the biometric monitor 106(2) has dropped to a critical battery level threshold. Thus, the body-worn hub 104 may use the wired connector 126(N) and the wired connectors 126(2) to route electrical power from the body camera 106(N) to the biometric monitor 106(2) to charge the battery of the biometric monitor 106(2).

In further embodiments, the body-worn hub 104 may be configured such that the hub will automatically stop using wireless communication with a body-worn device and default to using wired communication when an electrically conductive wired connection is made between the body-worn hub and the body-worn device. The wired communication may enable at least the same data to be exchanged between the body-worn hub 104 and the body-worn device as the wireless communication. For example, when a wired communication link is established between the body-worn hub 104 and the gun sensor 106(1) via the wired connector 126(1), the body-worn hub 104 may automatically terminate an existing wireless communication link 120(1) between the body-worn hub 104 and the gun sensor 106(1). However, when the electrically conductive wired connection between the body-worn hub and the body-worn device is disconnected, the body-worn hub 104 may automatically switch to using wireless communication with the body-worn device. For example, when the wired communication link between the body-worn hub 104 and the gun sensor 106(1) is terminated due to the disconnection of the wired connector 126(1), the body-worn hub 104 may reestablish the wireless communication link 120(1) with the gun sensor 106(1).

The body-worn hub 104 may process at least one event notification that the hub receives from one or more body-worn devices, such as one or more of the body-worn devices 106(1)-106(N), to determine whether to trigger the performance of actions by at least one body-worn device of the body-worn devices 106(1)-106(N). In some embodiments, the body-worn hub 104 may include a software event handler that processes event notifications and generate commands for the connected body-worn devices. For example, the body-worn hub 104 may trigger the body camera 106(N) of a law enforcement officer 102 to start a video recording when the body-worn hub 104 is notified by the gun sensor 106(1) that the officer's gun is unholstered.

Example Body-Worn Device Components

Figure 2:
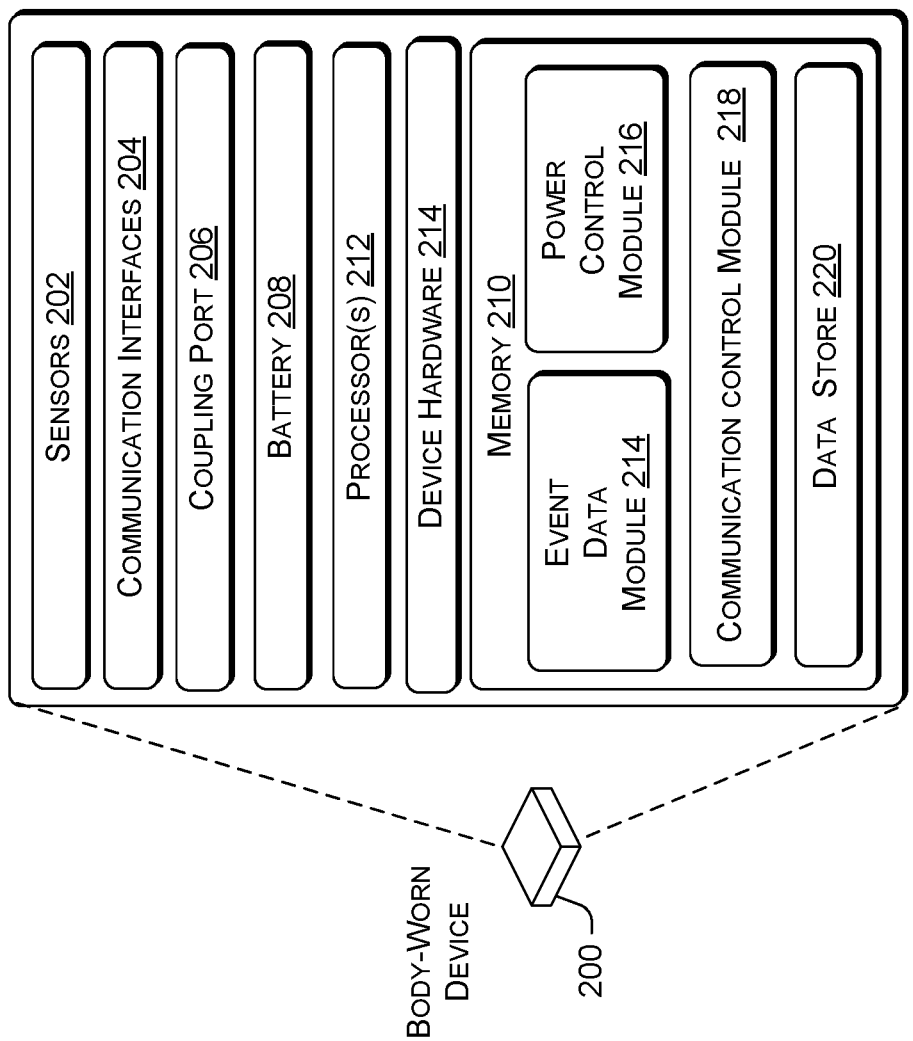
FIG. 2 is a block diagram showing various components of a body-worn device that engages with a body-worn hub that provides adaptive power and communication routing for body-worn devices.

FIG. 2 is a block diagram showing various components of a body-worn device that engages with a body-worn hub that provides adaptive power and communication routing for body-worn devices. The body-worn device 200 may be equipped with one or more sensors 202, communication interfaces 204, an electrically conductive coupling port 206, a battery 208, memory 210, one or more processors 212, and device hardware 214. The sensors 202 may include a compass, an accelerometer, one or more pressure sensors, a global positioning system (GPS) sensor, an audio sensor, a video sensor, and/or so forth. The communication interfaces 204 may include short-range wireless transceivers (e.g., Bluetooth, UWB, Wi-Fi, and/or so forth) and long-range wireless transceivers (e.g., cellular, satellite, and/or so forth) that enable the body-worn device 200 to wirelessly communicate with other devices. The electrically conductive coupling port 206 may be configured to accept an electrically conductive wired connector. The wired connector may be used by the body-worn device 200 to receive power input to the body-worn device 200 from an external source, output power from the body-worn device 200 to an external load, as well as perform wired communication.

The memory 210 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 214 may include user interface hardware, such as physical buttons, a gesture recognition mechanism, or a voice activation mechanism. The device hardware 214 may further include signal converters, antennas, modems, hardware decoders and encoders, graphic processors, digital signal processors, microprocessors, power routing circuitry, and/or so forth. The device hardware 214 may enable the body-worn device 200 to exchange wired or wireless communication with other devices via the communication interfaces 204, as well as receive power or output power via the electrically conductive coupling port 206 based on software instructions.

The processors 212 and the memory 210 of the body-worn device 200 may implement an event data module 216, a power control module 218, and a communication control module 220. These modules may include routines, program instructions, objects, and/or data structures that perform particular tasks or implement particular abstract data types. The memory 210 may further store software (e.g., drivers, applications, firmware, etc.) that support various functionalities of the body-worn device 200, such as software that are executed by the processors 212 to support the establishment of wired and wireless communication links. The memory 210 may also provide a data store 222 that is capable of storing event data. The event data may include sensor data captured by the sensors 202, associated metadata for the sensor data, the corresponding event notification, and/or so forth. In some embodiments, an operating system may also be implemented via the one or more processors 212 and the memory 210 to perform various functions, as well as provide an execution environment that supports the executions of applications and modules.

The event data module 216 may send event data that includes event notifications of detected events and/or sensor data associated with the events to the body-worn hub 104, the vehicle hub 116, or the servers 114 of the NOC 112. The event data module 216 may send the event data to the body-worn hub 104 via available wired communication or alternatively via short-range wireless communication. However, event data that are destined for the vehicle hub 116 or the servers 114 are sent via short-range or long-range wireless communication. In turn, the event data module 216 may receive commands for the body-worn device 200 to perform specific actions. For example, such actions may include activating or deactivating one or more specific sensors, built-in functions, software applications, hardware components, and/or so forth of the body-worn device 200.

The power control module 218 may be configured to determine its battery charge level of the battery 208 based on values of various measured charge state parameters as the internal battery is charged and discharged. For example, a current integration function of the power control module 218 may calculate the battery charge level by measuring the current of its internal battery and integrating it over time. Other examples of charge state parameter values may include the output voltage of the internal battery over time, change in a chemical pH level of the internal battery that results from battery charging and discharging, change in a volume of the internal battery as measured by a pressure sensor due to battery charging and discharging, a charge state parameter value that is calculated based on a combination of other charge state parameter values, and/or so forth.

Thus, a state of charge (SoC) algorithm of the power control module 218 may use a value conversion function to convert the measured charge state parameter value to a battery charge level value. The battery charge level value may be a remaining battery percentage value, an estimated remaining battery reserve value (e.g., watt-hour (Wh), milliwatt-hour (mWh), amp-hour (Ah), milliamp-hour (mAh), etc.), or some other value that measures the remaining battery charge level. Accordingly, when the power control module 218 determines that the battery charge level value has dropped to a corresponding critical battery charge level threshold, the power control module 218 may send a critical battery status notification to the body-worn hub 104. The corresponding critical battery charge level threshold may be configured to provide the body-worn device 200 with a predetermined amount of last resort buffer operation time (e.g., 10 minutes, 15 minutes, 30 minutes, etc.) before device shutdown occurs. A critical battery charge level threshold of a body-worn device may be configured based on factors such as the battery capacity of the body-worn device, the power consumption rate of the body-worn device, the perceived importance of the body-worn device to be operational at all times, and/or so forth. The critical battery charge level threshold may be a remaining battery percentage value, an estimated remaining battery reserve value, or some other value that corresponds to the battery charge level value. For example, the critical battery charge level threshold value for a body camera may be 40%, while the critical battery charge level threshold value for a biometric monitor may be 20%.

A critical battery status notification sent to the body-worn hub 104 may indicate that the battery charge level of the body-worn device 200 is at or below a critical level, the measured battery charge level value, and/or a corresponding operational battery charge level threshold value. The operational battery charge level threshold value may be a minimal value that the body-worn device 200 is configured to try to maintain at all times, in which the operational battery charge level threshold value may range from a value that charges the battery 208 to its full capacity, i.e., 100%, to a value that is just above the critical battery charge level threshold value. For example, the operational battery charge level threshold value for a body camera may be 50%, while the operational battery charge level threshold for a biometric monitor may be 30%. In some embodiments, the critical battery status notification may further include device identification information of the body-worn device 200. The identification information may include a unique device identifier, a device manufacturer identifier, a device model identifier, and/or so forth. Further, the power control module 218 may be configured to send an operational battery status notification to the body-worn hub 104 once the battery 208 is charged to the operational battery charge level threshold value.

In other embodiments, the power control module 218 may be configured to provide general battery status notifications of the battery 208 to the body-worn hub 104 on a periodic basis or in responses to battery status queries from the body-worn hub 104. Such general battery status notifications may include information such as the device identification information, the measured battery charge level value, the critical battery charge level threshold value, the operational battery charge level threshold value, and/or so forth. In various embodiments, the power control module 218 is configured to send the battery status notifications when the communication control module 220 indicates that the body-worn device is connected to the body-worn hub 104 via a wired connection. The battery status notifications may be in the form of digital data or analog signals.

The communication control module 220 may switch the body-worn device 200 between using the short-range wireless transceiver and the electrically conductive coupling port 206 to exchange communications with the body-worn hub 104. In order to establish a short-range wireless communication link with a body-worn hub, the communication control module 220 may use a device authentication credential (e.g., a device identifier, a secret code, a key, a digital certificate, and/or so forth) to authenticate the body-worn device 200 to the body-worn hub. Alternatively, or concurrently, the body-worn hub may provide a hub authentication credential to the communication control module 220 so that the module may authenticate the body-worn hub. In some embodiments, the communication control module 220 may automatically terminate a short-range wireless communication link that is established with the body-worn hub 104 when a wired connection is established with the body-worn hub 104 via the electrically conductive coupling port 206. For example, the communication control module 220 may detect that the body-worn device 200 is connected to another device via a wired connector by a detected change in one or more electrical properties (e.g., voltage, resistance, and/or current) at the electrically conductive coupling port 206. As a result, the communication control module 220 may terminate the short-range wireless communication link by powering off the short-range wireless transceiver.

In other embodiments, the communication control module 220 may further use a wired communication protocol (e.g., Universal Serial Bus (USB) protocol, TCP/IP, or some other wired communication protocol) to establish a wired communication link with the body-worn hub 104 over the wired connection. In some instances, the communication control module 220 may wait for the body-worn hub 104 to initiate the establishment of the wired communication link using the wired communication protocol. However, in other instances, the communication control module 220 may initiate the establishment of the wired communication link with the body-worn hub 104 using the wired communication protocol. Once the wired communication link is established, the communication control module 220 may terminate the short-range wireless communication link by powering off the short-range wireless transceiver.

In still other embodiments, the communication control module 220 may terminate the short-range wireless communication link when a short-range wireless communication termination command is received from the body-worn hub 104. The communication control module 220 may receive the termination command when a wired connection is established between the body-worn device 200 and the body-worn hub 104 via the electrically conductive coupling port 206. The termination command may be received via the wired connection between the body-worn device 200 and the body-worn hub 104. Accordingly, the communication control module 220 may terminate the short-range wireless communication by powering off the short-range wireless transceiver. However, in other instances, the body-worn hub 104 may simply terminate the short-range wireless communication link between the body-worn device 200 and the body-worn hub 104 at its end once the wired connection is established between the body-worn device 200 and the body-worn hub 104. In some instances, following the power off of the short-range wireless transceiver, the communication control module 220 may send a short-range wireless transceiver termination confirmation to the body-worn hub 104 via the electrically conductive coupling port 206.

Conversely, when the communication control module 220 detects that the wired connection between the body-worn device 200 and the body-worn hub 104 is terminated, the communication control module 220 may power on the short-range wireless transceiver. For example, the one or more electrical properties at the electrically conductive coupling port 206 may indicate to the communication control module 220 that the wired connection is severed. The powering on of the short-range wireless transceiver may enable the body-worn device 200 to reestablish a short-range wireless communication link with the body-worn hub 104.

Example Body-Worn Hub Components

Figure 3:
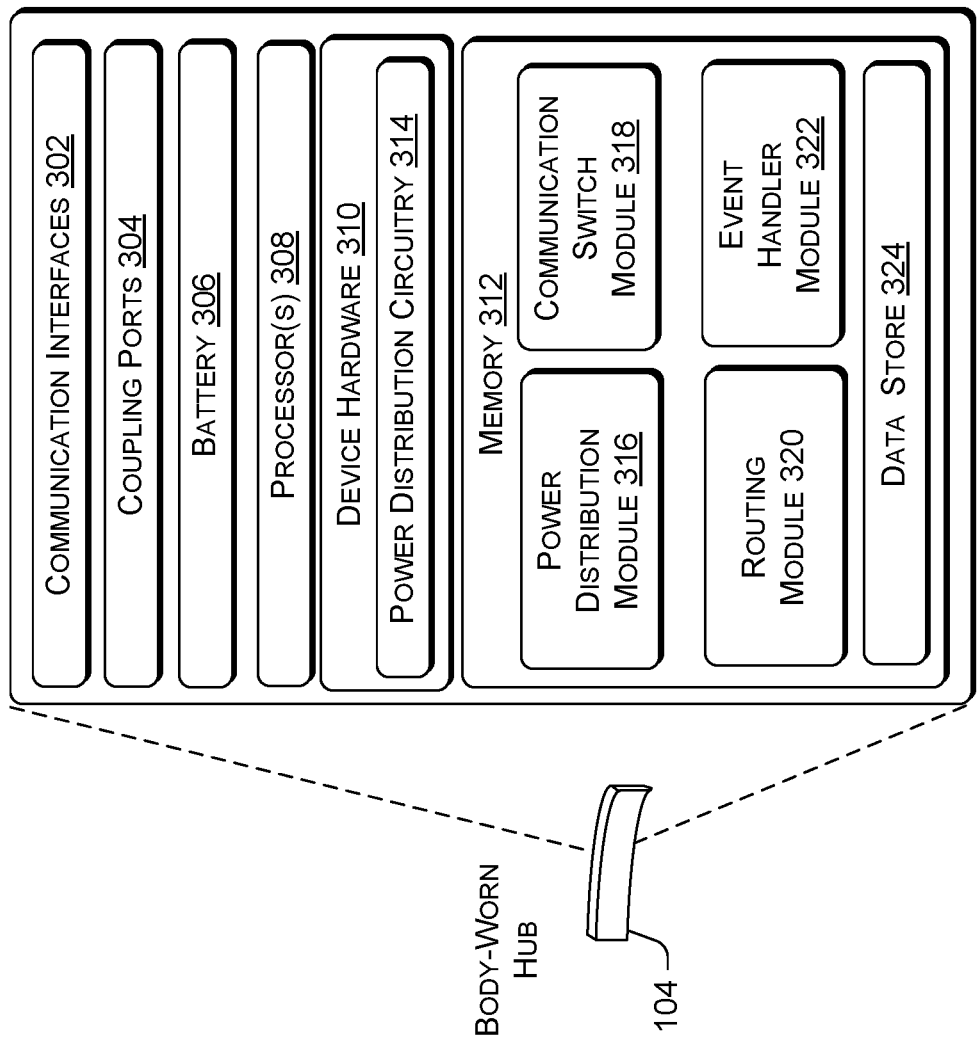
FIG. 3 is a block diagram showing various components of a body-worn hub that provides adaptive power and communication routing for body-worn devices.

FIG. 3 is a block diagram showing various components of a body-worn hub that provides adaptive power and communication routing for body-worn devices. The body-worn hub may be equipped with communication interfaces 302, a set of electrically conductive coupling ports 304, a battery 306, one or more processors 308, device hardware 310, and memory 312. The communication interfaces 302 may include one or more short-range wireless communication transceivers (e.g., Bluetooth, UWB, Wi-Fi transceivers, and/or so forth), one or more long-range wireless communication transceivers (e.g., cellular, satellite, and/or so forth). Each of the electrically conductive coupling port 304 may be configured to accept an electrically conductive wired connector. The wired connector may be used by the body-worn hub 104 to receive power input from an external source, output power to an external load, as well for performing wired communications. Generally speaking, the battery 306 of the body-worn hub 104 is configured to have a larger battery capacity than the batteries of the body-worn device.

The device hardware 310 may include signal converters, antennas, modems, hardware decoders and encoders, digital signal processors, and/or so forth that enable the body-worn hub 104 to execute applications and exchange data with other devices, such as the body-worn devices 106(1)-106(N), via wired or wireless communication. The device hardware 310 may further include a power distribution circuitry 314 that is able to distribute power from the battery 306 to specific coupling ports based on software commands. The power distribution circuitry 314 may also open and close electrical pathways between various coupling ports based on software commands to route power between those ports. For example, the power distribution circuitry 314 may include a microprocessor that triggers electronic components of the circuitry to route power from a power source to a power distribution point based on software instructions.

The memory 312 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 308 and the memory 312 of the body-worn hub 104 may implement a power distribution module 316, a communication switch module 318, a routing module 320, and an event handler module 322. These modules may include routines, program instructions, objects, and/or data structures that perform particular tasks or implement particular abstract data types. The memory 312 may further store software (e.g., drivers, applications, firmware, etc.) that support various functionalities of the body-worn hub 104, such as software that are executed by the processors 308 to support the establishment of wired and wireless communication links. The memory 312 may also provide a data store 324. The data store 324 may store the sensor data collected by the body-worn devices 106(1)-106(N). In some embodiments, an operating system may also be implemented via the one or more processors 308 and the memory 312 to perform various functions, as well as provide an execution environment that supports the executions of applications and modules.

In some embodiments, the power distribution module 316 may distribute power from the battery 306 of the body-worn hub 104 to a body-worn device. In such embodiments, the power distribution module 316 may receive a critical battery status notification from a body-worn device via a wired connection at a particular coupling port of the body-worn hub 104. The critical battery status notification may indicate that the battery charge level of a battery in the body-worn device is critical. In response, the power distribution module 316 may determine whether the battery charge level of its battery 306 is above corresponding operational battery charge level threshold in a similar manner as described with respect to the body-worn device. Accordingly, if the battery charge level of the battery 306 is above the operational battery charge level threshold, the power distribution module 316 may route power from the battery 306 to the body-worn device via the wired connection at the particular coupling port. The routing of such power may continue until an operational battery status notification is received from the body-worn device via the wired connection or if the battery charge level of the battery 306 drops to the corresponding operational battery charge level threshold. However, if the power distribution module 316 determines that the battery charge level of its battery 306 is not above the corresponding operational battery charge level threshold, the power distribution module 316 may command the event data module 216 to generate an event notification indicating that the battery charge level of the body-worn device is at or below a critical battery threshold, and direct the body-worn device or another body-worn (e.g., a smartphone) to present the event notification (e.g., an alert message) to the law enforcement officer carrying the body-worn device.

For example, a body-worn device may send a critical battery status notification to the body-worn hub 104 when the battery charge level of its battery drops to 10%, which is below its operational battery charge level threshold of 20%. The power distribution module 316 may further determine that the battery charge level of the battery 306 in the body-worn hub 104 is 60%, which is above its corresponding operational battery charge level threshold value of 25%. According, the power distribution module 316 may route power to the body-worn device until the earlier of (1) the body-worn device sending an operational battery status notification when its operational battery charge level threshold value of 20% is reached, or (2) the battery charge level of the battery 306 of the body-worn hub 104 drops to the critical threshold of 25%.

In other embodiments, the power distribution module 316 may route power from the batteries of one or more other body-worn devices to a particular body-worn device based on battery charge level percentage values. In some instances, the power distribution module 316 may receive a critical battery status notification from a particular body-worn device via a wired connection at a particular coupling port of the body-worn hub 104. The critical battery status notification may indicate that the battery charge level of a battery in the particular body-worn device is critical. In response, the power distribution module 316 may send a query to each of the one or more remaining body-worn devices that are connected to the body-worn hub 104 via wired connections. Each query may ask for a current battery charge level that is a percentage value and an operational battery charge level threshold that is a percentage value of a particular body-worn device. The power distribution module 316 may then identify one or more of the remaining body-worn devices each with a current battery charge level that is higher than a corresponding operational battery charge level threshold as a donor body-worn device. For example, a remaining body-worn device may be identified when its current battery charge level value is 90%, and its operational battery charge level threshold value is 50%.

The power distribution module 316 may then route power from the one or more donor body-worn devices to the particular body-worn device. In an instance in which only one specific donor body-worn device is identified, the power distribution module 316 may route power from the specific donor body-worn device to the particular body-worn device until the earlier of (1) an operational battery status notification is received from the particular body-worn device via the wired connection, or (2) the power distribution module 316 detects that the battery charge level of the specific donor body-worn device has dropped to its corresponding operational battery charge level threshold. The detection may be performed by the power distribution module 316 sending a query and receiving a query response from a donor body-worn device, or the power distribution module 316 receiving a self-initiated notification from the donor body-worn device.

In another instance in which multiple donor body-worn devices are identified, the power distribution module 316 may route power from a first donor body-worn device that has the greatest difference between its current battery charge level percentage value and its operational battery charge level threshold percentage value until its battery charge level is detected by the power distribution module 316 as having reached the operational battery charge level threshold, then from a second donor body-worn device that has the next greatest difference between its current battery charge level percentage value and its operational battery charge level threshold percentage value, and/or so on and so forth. The power distribution module 316 may be configured to route power from the multiple donor body-worn devices to the particular body-worn device in this manner, in which the routing of power is stopped when the earlier of (1) an operational battery status notification being received from the particular body-worn device via the wired connection, or (2) the last device in the succession of the multiple donor devices has its battery charge level percentage value drop to a corresponding operational battery charge percentage threshold value.

However, in an instance in which no donor body-worn devices is identified, the power distribution module 316 may command the event data module 216 to generate an event notification indicating that the battery charge level of the particular body-worn device is at or below a critical battery threshold, and direct the body-worn device or another body-worn (e.g., a smartphone) to present the event notification (e.g., an alert message) to the law enforcement officer carrying the body-worn device.

In additional embodiments, the power distribution module 316 may route power from the batteries of one or more other body-worn devices to a particular body-worn device based on remaining battery reserve values (e.g., Wh, mWh, Ah, mAh, etc.). In some instances, the power distribution module 316 may receive a critical battery status notification from a particular body-worn device via a wired connection at a particular coupling port of the body-worn hub 104. The critical battery status notification may indicate that the battery charge level of a battery in the particular body-worn device is critical. In response, the power distribution module 316 may send a query to each of the one or more remaining body-worn devices that are connected to the body-worn hub 104 via wired connections. Each query may ask for a current battery charge level that is a remaining battery reserve value and an operational battery charge level threshold that is a battery reserve value of a particular body-worn device. The power distribution module 316 may then identify one or more of the remaining body-worn devices each with a current battery charge level that is higher than a corresponding operational battery charge level threshold as a donor body-worn device. For example, a remaining body-worn device may be identified when its current battery charge level (battery reserve) value is 2000 mAh, and its operational battery charge level threshold value is 1000 mAh.

The power distribution module 316 may then route power from the one or more donor body-worn devices to the particular body-worn device. In an instance in which only one specific donor body-worn device is identified, the power distribution module 316 may route power from the specific donor body-worn device to the particular body-worn device until the earlier of (1) an operational battery status notification is received from the particular body-worn device via the wired connection, or (2) the power distribution module 316 detects that the battery charge level (battery reserve) value of the specific donor body-worn device has dropped to its corresponding operational battery charge level (battery reserve) threshold value. The detection may be performed by the power distribution module 316 sending a query and receiving a query response from a donor body-worn device, or the power distribution module 316 receiving a self-initiated notification from the donor body-worn device.

In another instance in which multiple donor body-worn devices are identified, the power distribution module 316 may route power from a first donor body-worn device that has the greatest difference between its current battery charge level (battery reserve) value and its operational battery charge level threshold (battery reserve) value until its battery charge level is detected by the power distribution module 316 as having reached the operational battery charge level threshold, then from a second donor body-worn device that has the next greatest difference between its current battery charge level (battery reserve) value and its operational battery charge level threshold (battery reserve) value, and/or so on and so forth. The power distribution module 316 may be configured to route power from the multiple donor body-worn devices to the particular body-worn device in this manner, in which the routing of power is stopped when the earlier of (1) an operational battery status notification being received from the particular body-worn device via the wired connection, or (2) the last device in the succession of the multiple donor devices has its battery charge level (battery reserve) value drop to a corresponding operational battery charge (battery reserve) level. In various embodiments, the power distribution module 316 may route power between body-worn devices when the power distribution module 316 determines that a battery of the body-worn hub 104 is insufficient to charge the battery of the body-worn device to an operational battery charge level threshold.

The communication switch module 318 may switch the body-worn hub 104 between using the short-range wireless transceiver and a corresponding electrically conductive coupling port to exchange communications with a body-worn device. In order to establish a short-range wireless communication link with a body-worn device, the communication switch module 318 may use a device authentication credential (e.g., a device identifier, a secret code, a key, a digital certificate, and/or so forth) provided by a body-worn device to authenticate the body-worn device. Alternatively, or concurrently, the communication switch module 318 may provide a hub authentication credential to the body-worn device for the body-worn device to authenticate the body-worn hub. Thus, short-range wireless communication link may be established between the body-worn hub and the body-worn device following one-way or mutual authentication. In some embodiments, the communication switch module 318 may automatically terminate a short-range wireless communication link that is established with the body-worn device when a wired connection is established with the body-worn device via a particular coupling port of the set of electrically conductive coupling ports 206. For example, the communication switch module 318 may detect that the body-worn device is connected to a particular coupling port based on change in one or more electrical properties (e.g., voltage, resistance, and/or current) at the particular coupling port. As a result, the communication switch module 318 may send a termination command via the particular coupling port to command the body-worn device to power off its short-range transceiver.

In other embodiments, the communication switch module 318 may further use a wired communication protocol (e.g., Universal Serial Bus (USB) protocol, TCP/IP, or some other wired communication protocol) to establish a wired communication link with the body-worn hub 104 over the wired connection. In some instances, the communication switch module 318 may wait for the body-worn device to initiate the establishment of the wired communication link using the wired communication protocol. However, in other instances, the communication switch module 318 may initiate the establishment of the wired communication link with the body-worn device using the wired communication protocol. Once the wired communication link is established, the communication switch module 318 may send a termination command via the particular coupling port to command the body-worn device to power off its short-range transceiver. In some instances, when the communication switch module 318 has received short-range wireless communication termination confirmations from all body-worn devices connected to its coupling ports, the communication switch module 318 may power off its short-range transceiver as well to conserve battery power.

Conversely, when the communication switch module 318 detects that the wired connection between the body-worn hub 104 and at least one body-worn device is severed, the communication switch module 318 may power on the short-range wireless transceiver of the body-worn hub 104. For example, the one or more electrical properties at the electrically conductive coupling port 206 may indicate to the communication switch module 318 that the wired connection is severed. In another example, the communication switch module 318 may determine that a wired connection to a body-worn device is severed when there is a lack of a periodic keep alive or heart beat signal received from the body-worn device via the wired connection for a predetermined period of time. The powering on of the short-range wireless transceiver may enable the body-worn hub 104 to reestablish a short-range wireless communication link with the body-worn device with the severed wired connection.

The routing module 320 may handle the routing of event data of events that are received from the body-worn devices, such as the body-worn devices 106(1)-106(N), to various recipient devices and services. In various embodiments, the routing module 320 may route event data from one or more body-worn devices to the event handler module 322, to the vehicle hub 116, and/or to the servers 114 of the network NOC 112. In some embodiments, the vehicle hub 116 may also have long-range wireless communication capabilities to communicate with the server 114, so that the vehicle hub 116 may relay communications from other devices and hubs to the server 114, and vice versa. The routing module 320 may handle the routing of event data based on customizable configuration settings stored in a configuration file. For example, the configuration settings for event data of an event may specify that the event data is to be stored and/or processed at the body-worn hub 104 for generating commands to body-worn devices. In another example, the configuration settings may specify that the event data is to be routed to the vehicle hub 116 for storage and/or processing. In an additional example, the configuration settings may specify that the event data is to be routed to the servers 114 of the NOC 112 for storage and/or processing. In other examples, the configuration settings for the event data may specify a combination of one or more of such routings for the event data. In some embodiments, the routing module 320 may receive updates or modifications to the configuration file from the servers 114 of the NOC 112 for storage in the data store 324.

The event handler module 322 may use an event handler to process event data received from one or more body-worn devices to generate commands for at least one specific body-worn device to perform a particular action. In various embodiments, the event data may include notifications received from body-worn devices that are directly connected to the body-worn hub 104 and/or notifications received from body-worn devices connected to other hubs. For example, the event handler module 322 may generate a command for the body camera 106(1) to start recording when event handler module 322 receives a notification that the gun 110 is unholstered. In another example, the event handler module 322 may generate a command for the body camera 106(1) to start recording when event handler module 322 receives a notification that the gun 110 is unholstered and the biometric monitor 106(2) detects that the heart rate of the law enforcement officer 102 is above a predetermined rate threshold.

In some embodiments, the event handler module 322 may generate at least one particular command in response to one or more specific events based on a customizable handler configuration file. The customizable handler configuration file may specify one or more actions to be taken and the body-worn devices that are to take the actions for different sets of one or more event data. In other embodiments, the event handler module 322 may use a machine-learning algorithm to determine one or more actions to be taken and the body-worn devices that are to take the action based on different sets of one or more event data. In some embodiments, the event handler module 322 may receive updates or modifications to the handler configuration profile from the servers 114 of the NOC 112 for storage in the data store 324.

Example Processes

Figure 4:
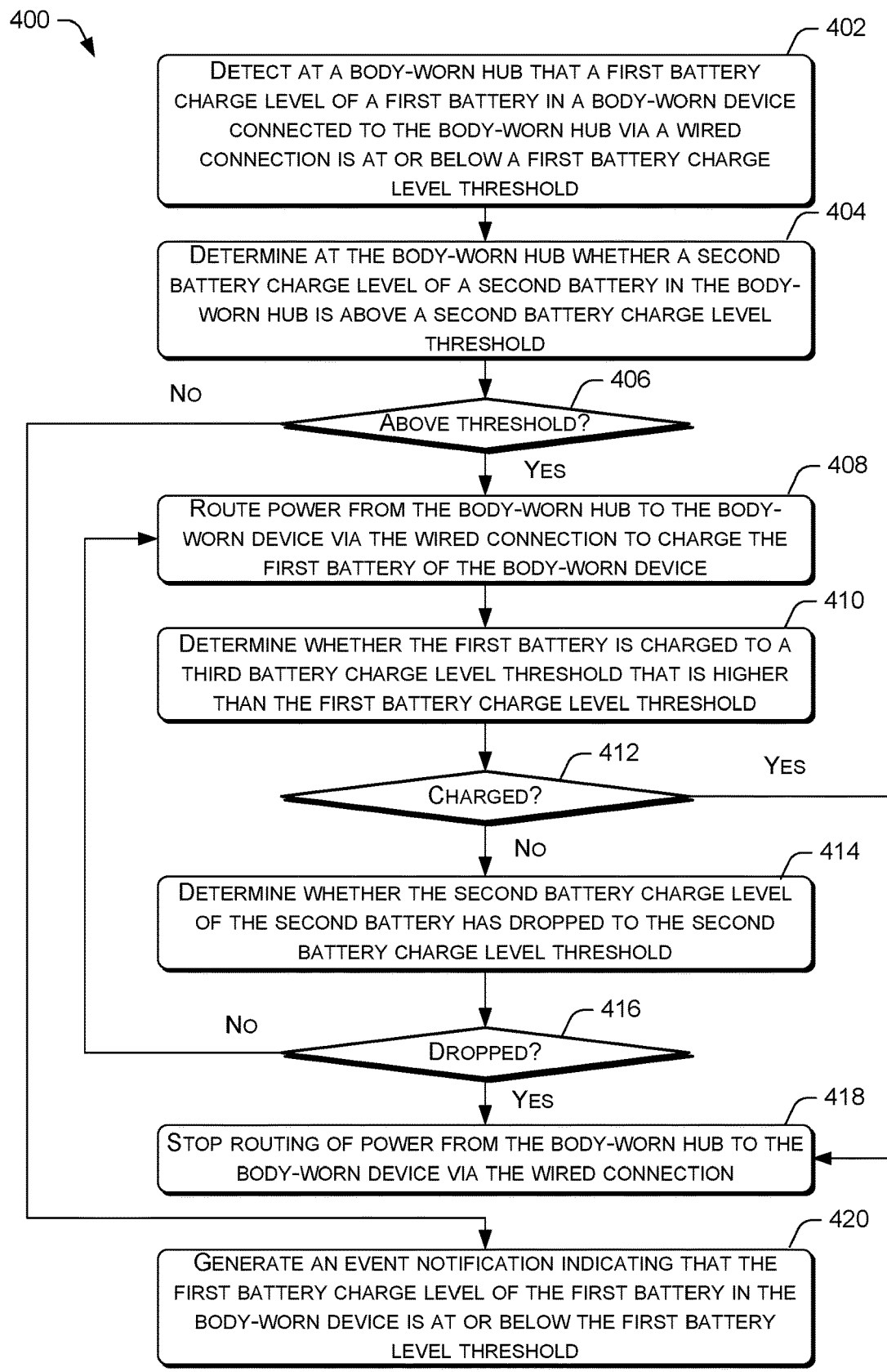
FIG. 4 is a flow diagram of an example process for routing power from a body-worn hub to a body-worn device via a wired connection between the body-worn hub and the body-worn device.
Figure 5:
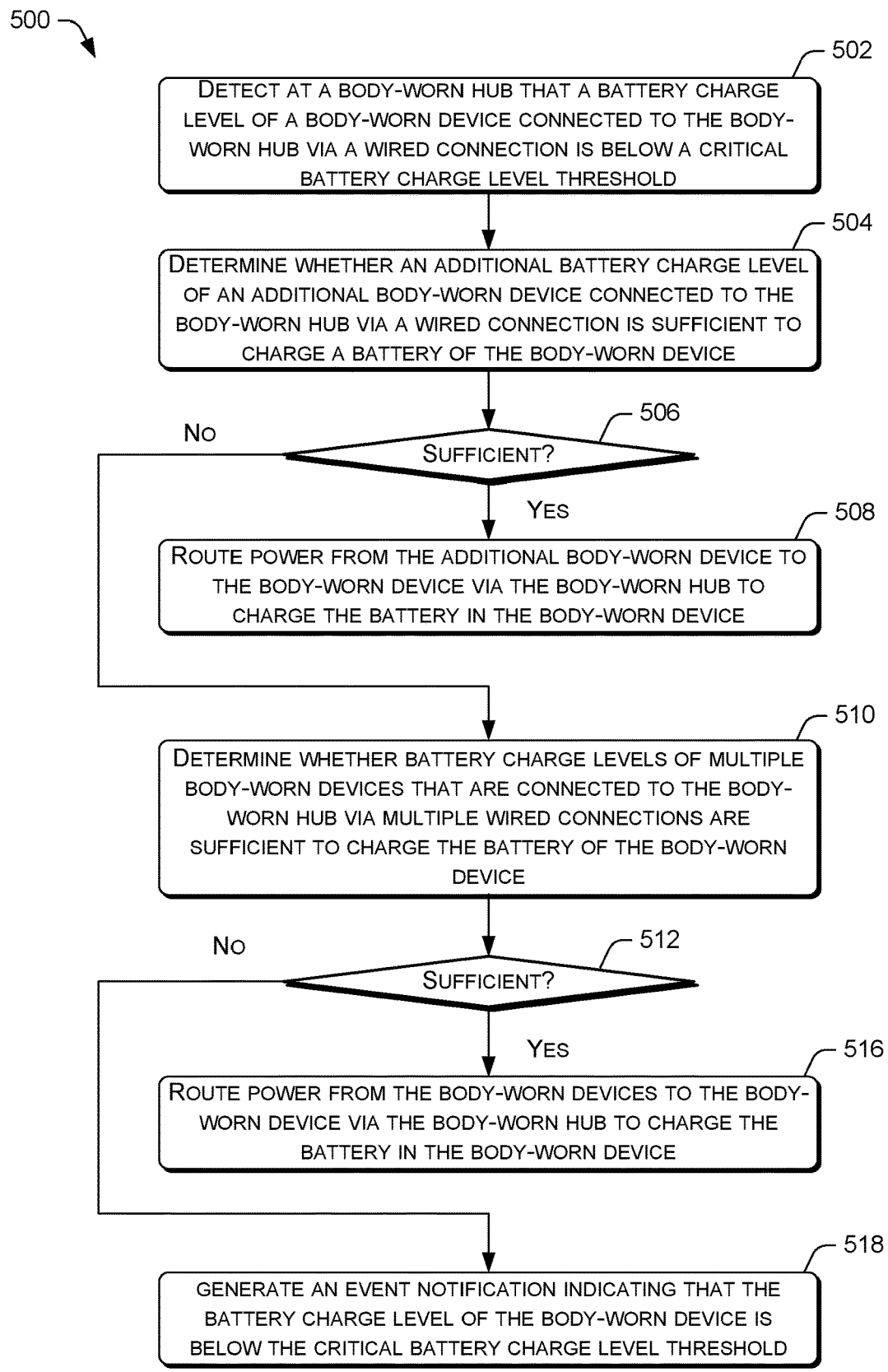
FIG. 5 is a flow diagram of an example process for using a body-worn hub to distribute power between multiple body-worn devices that are connected to the body-worn hub via wired connections.
Figure 6:
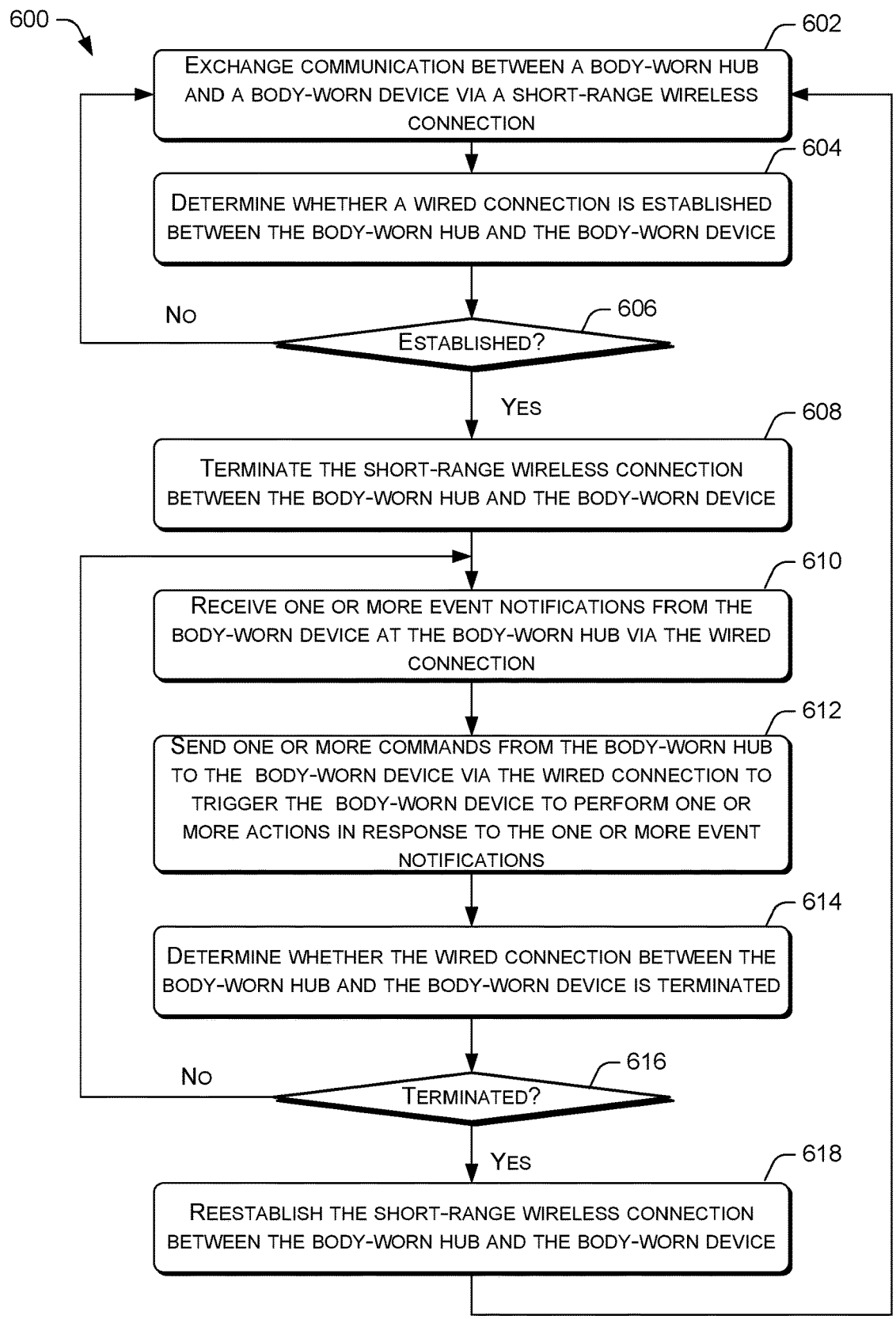
FIG. 6 is a flow diagram of an example process for switching a body-worn hub between using wireless communication and wired communication with a body-worn device.

FIGS. 4-6 present illustrative processes 400-600 for implementing a body-worn hub that provides adaptive power and communication routing for body-worn devices. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the environment 100 of FIG. 1.

FIG. 4 is a flow diagram of an example process 400 for routing power from a body-worn hub to a body-worn device via a wired connection between the body-worn hub and the body-worn device. At block 402, the body-worn hub 104 may detect that a first battery charge level of a first battery in a body-worn device connected to the hub via a wired connection is at or below a first battery charge level threshold. In various embodiments, the body-worn hub 104 may make the detection when the body-worn hub 104 receives a critical battery charge status notification indicating that the battery charge level of the first battery is at or below a critical battery charge level threshold.

At block 404, the body-worn hub 104 may determine whether a second battery level of a second battery in the body-worn hub is above a second battery charge level threshold. In various embodiments, the second battery charge level threshold may be an operational battery charge level threshold for the second battery. At decision block 406, if the second battery charge level is above the second battery charge level threshold ("yes" at decision block 406), the process 400 may proceed to block 408.

At block 408, the body-worn hub 104 may route power from the body-worn hub to the body-worn device via the wired connection. In various embodiments, the wireless connection may connect an electrically coupling port of the body-worn hub 104 to an electrically conductive coupling port of the body-worn device. At block 410, the body-worn hub 104 may determine whether the first battery is charged to a third battery charge level threshold that is higher than the first battery charge level threshold. In various embodiments, the third battery charge level may be an operational battery level threshold of the first battery in the body-worn device.

At decision block 412, if the first battery is not charged to the third battery charge level threshold ("no" at decision block 412), the process 400 may proceed to block 414. At block 414, the body-worn hub 104 may determine whether the second battery charge level of the second battery has dropped to the second battery charge level threshold. At decision block 416, if the body-worn hub 104 determines that the second battery charge level has dropped to the second battery charge level threshold ("yes" at decision block 416), the process 400 may proceed to block 418. At block 418, the body-worn hub 104 may stop routing of power from the body-worn hub 104 to the body-worn device via the wired connection.

Returning to decision block 412, if the first battery is charged to the third battery charge level threshold ("yes" at decision block 412), the process 400 may proceed to block 418. Returning to decision block 416, if the body-worn hub 104 determines that the second battery charge level has not dropped to the second battery charge level threshold ("no" at decision block 416), the process 400 may loop back to block 408.

Returning to decision block 406, if the second battery charge level is not above the second battery charge level threshold ("no" at decision block 406), the process 400 may proceed to block 420. At block 420, the body-worn hub 104 may generate an event notification indicating that the first battery charge level of the body-worn device is at or below the first battery charge level threshold. In various embodiments, the body-worn hub 104 may direct the body-worn device or another body-worn device (e.g., a smartphone) to present the event notification (e.g., an alert message) to a law enforcement officer carrying the body-worn device.

FIG. 5 is a flow diagram of an example process 500 for using a body-worn hub to distribute power between multiple body-worn devices that are connected to the body-worn hub via wired connections. In some embodiments, the example process 500 may be implemented by the body-worn hub 104 when the body-worn hub 104 is able to sufficiently charge a body-worn device using its own internal battery. At block 502, the body-worn hub 104 may detect that a battery charge level of a body-worn device connected to the body-worn hub via a wired connection is at or below a critical battery charge level threshold. In various embodiments, the body-worn hub 104 may make the detection when the body-worn hub 104 receives a critical battery charge status notification indicating that the battery charge level of a battery in the body-worn device is at or below a critical battery charge level threshold.

At block 504, the body-worn hub 104 may determine whether an additional battery charge level of an additional body-worn device connected to the body-worn hub via a wired connection is sufficient to charge a battery of the body-worn device. In various embodiments, the battery charge level of an additional body-worn device may be sufficient if the battery charge level is above a corresponding operational battery charge level threshold.

At decision block 506, if the body-worn hub 104 determines that the additional battery charge level of the additional worn device is sufficient to charge the battery of the body-worn device ("yes" at decision block 506), the process 500 may proceed to block 508. At block 508, the body-worn hub 104 may route power from the additional body-worn device to the body-worn device via the body-worn hub. In various embodiments, the body-worn hub 104 may route power from the additional body-worn device to the body-worn device until the earlier of (1) an operational battery status notification being received from the body-worn device via the wired connection, or (2) the body-worn hub 104 detects that the battery charge level value of the additional body-worn device has dropped to its corresponding operational battery charge level threshold value. The operational battery status notification may indicate that the battery of the body-worn hub has been charged to a corresponding operational battery charge level threshold. The body-worn hub 104 may detect that the battery charge level of the additional body-worn device has dropped to its corresponding operational battery charge level threshold when a critical battery charge status notification is received from the body-worn device.

However, if the body-worn hub 104 determines that the additional charge battery charge level of the additional worn device is not sufficient to charge the battery of the body-worn device ("no" at decision block 506), the process 500 may proceed to block 510. At block 510, body-worn hub 104 may determine whether battery charge levels of multiple body-worn devices that are connected to the body-worn hub via multiple wired connections are sufficient to charge the battery of the body-worn device.

At decision block 512, if the battery charge levels of the multiple body-worn devices are sufficient to charge the battery of the body-worn device ("yes" at decision block 512), the process 500 may proceed to block 516. In various embodiments, each of the multiple body-worn devices may have a current battery charge level that is above a corresponding operational battery charge level threshold.

At block 516, the body-worn hub 104 may route power from the multiple body-worn devices to the body-worn device via the body-worn hub. In various embodiments, the body-worn hub 104 may be configured to route power from the multiple donor body-worn devices to the body-worn device until the earlier of (1) an operational battery status notification being received from the body-worn device via the wired connection, or (2) the last device in the succession of the multiple donor devices has its battery charge level percentage value or battery reserve value drop to a corresponding operational battery charge percentage value or reserve value.

However, if the battery charge levels of the multiple body-worn devices are not sufficient to charge the battery of the body-worn device ("no" at decision block 512), the process 500 may proceed to block 518. At block 518, the body-worn hub 104 may generate an event notification indicating that the battery charge level of the body-worn device is at or below the critical battery level threshold. In various embodiments, the body-worn hub 104 may direct the body-worn device or another body-worn (e.g., a smartphone) to present the event notification (e.g., an alert message) to a law enforcement officer carrying the body-worn device.

FIG. 6 is a flow diagram of an example process 600 for switching a body-worn hub between using wireless communication and wired communication with a body-worn device. At block 602, the body-worn hub 104 may exchange communication with a body-worn device via a short-range wireless connection. In various embodiments, the short-range wireless connection may be established using the short-range transceivers included in the body-worn hub 104 and the body-worn device. At block 604, the body-worn hub 104 may determine whether a wired connection is established between the body-worn hub 104 and the body-worn device. At decision block 606, if the body-worn hub 104 determines that the wired connection is established ("yes" at decision block 606), the process 600 may proceed to block 608. In various embodiments, the body-worn hub 104 may make the determination based on change in one or more electrical properties at a coupling port of body-worn hub 104 that is associated with the body-worn device or when wired communication is established between the body-worn hub 104 and the body-worn device via a wired communication protocol.

At block 608, the body-worn hub 104 may terminate the short-range wireless connection between the body-worn hub 104 and the body-worn device. At block 610, the body-worn hub 104 may receive one or more event notifications from the body-worn device at the body-worn hub 104 via the wired connection. In some embodiments, the body-worn hub 104 may forward the one or more event notifications to another hub (e.g., a vehicle hub) or a server at a NOC. At block 612, the body-worn hub 104 may send one or more commands from the body-worn hub 104 to the boy-worn device via the wired connection to trigger the body-worn device to perform one or more actions in response to the one or more event notifications. In various embodiments, a command may be sent by the body-worn hub 104, another hub (e.g., a vehicle hub) or a server at a NOC.

At block 614, the body-worn hub 104 may determine whether the wired connection between the body-worn hub device is terminated. For example, the one or more electrical properties at an electrically conductive coupling port of the body-worn hub 104 may indicate to the body-worn hub 104 that the wired connection is severed. In another example, the body-worn hub 104 may determine that the wired connection to the body-worn device is severed when there is a lack of a periodic keep alive or heart beat signal received from the body-worn device via the wired connection for a predetermined period of time. At decision block 616, if the body-worn hub 104 determines that the wired connection is terminated ("yes" at decision block 616), the process 600 may proceed to block 618. At block 618, the body-worn hub 104 may reestablish the short-range wireless connection between the body-worn hub 104 and the body-worn device. However, if the body-worn hub 104 determines that the wired connection is not terminated ("no" at decision block 616), the process 600 may loop back to block 610. Returning to decision block 606, if the body-worn hub 104 determines that no wired connection is established ("no" at decision block 606), the process 600 may loop back to block 602.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a body-worn hub storing computer-executable instructions that upon execution cause one or more processors to perform acts comprising:

detecting at the body-worn hub that a first battery charge level of a first battery in a body-worn device connected to the body-worn hub via a wired connection is at or below a first battery charge level threshold;

routing power from the body-worn hub to the body-worn device via the wired connection to charge the first battery when a second battery charge level of a second battery in the body-worn hub is above a second battery charge level threshold; and in response to the first battery of the body-worn device being charged to a third battery charge level that is above the first battery charge level threshold or the second battery charge level dropping to the second battery charge level threshold, stopping routing of power from the body-worn hub to the body-worn device via the wired connection.

2. The one or more non-transitory computer-readable media of claim 1, wherein the acts further comprise, when the second battery charge level of the second battery in the body-worn hub is not above the second battery threshold prior to the routing of the power:

generating an event notification indicating that the first battery charge level of the first battery in the body-worn device is at or below the first battery charge level threshold; and sending the event notification to the body-worn device or another body-worn device for presentation.

3. The one or more non-transitory computer-readable media of claim 1, wherein the wired connection connects a first coupling port on the body-worn hub to a second coupling port on the body-worn device.

4. The one or more non-transitory computer-readable media of claim 1, wherein the body-worn hub is integrated into a ballistic vest worn by a law enforcement officer.

5. The one or more non-transitory computer-readable media of claim 1, wherein the body-worn device is a holster sensor, a biometric monitor, a smartphone, a radio, or a body camera.

6. The one or more non-transitory computer-readable media of claim 1, wherein the body-worn hub further comprises a first short-range wireless transceiver and the body-worn device includes a second short-range wireless transceiver, and wherein the acts further comprise:

exchanging communication between the body-worn hub and the body-worn device via a short-range wireless connection established using the first short-range wireless transceiver and the second short-range wireless transceiver;

terminating the short-range wireless connection between the body-worn hub and the body-worn device when the wired connection is established between the body-worn hub and the body-worn device;

receiving one or more event notifications from the body-worn device at or below the body-worn hub via the wired connection;

sending one or more commands from the body-worn hub to the body-worn device via the wired connection to trigger the body-worn device to perform one or more actions; and reestablishing the short-range wireless connection between the body-worn hub and the body-worn device when the wired connection between the body-worn hub and the body-worn device is terminated.

7. The one or more non-transitory computer-readable media of claim 6, wherein the acts further comprise generating the one or more commands via an event handler of the body-worn hub based on at least one of the one or more event notifications from the body-worn device, one or more first additional event notifications from one or more other body-worn devices connected to the body-worn hub, one or more second additional event notification from one or more other hubs connected to the body-worn hub, or one or more third event additional notifications from a server of a network operations center (NOC).

8. The one or more non-transitory computer-readable media of claim 6, wherein the acts further comprise sending the one or more event notifications from the body-worn device to at least one of a vehicle hub of a law enforcement vehicle or a server of a network operations center (NOC).

9. The one or more non-transitory computer-readable media of claim 6, wherein the one or more commands are generated by an additional hub connected to the body-worn hub or a server of a network operations center (NOC).

10. A body-worn hub, comprising:
one or more processors; and
memory including a plurality of computer-executable components that are executable by the one or more processors to perform a plurality of actions, the plurality of actions comprising:
detecting at the body-worn hub that a battery charge level of a battery in a body-worn device connected to the body-worn hub via a wired connection is at or below a battery charge level threshold;
in response to determining that an additional battery charge level of an additional body-worn device connected to the body-worn hub via a wired connection is sufficient to charge the battery in the body-worn device, routing power from the additional body-worn device to the body-worn device via the body-worn hub to charge the battery in the body-worn device; and
in response to determining that the additional battery charge level of the additional body-worn device is insufficient to charge the battery of the body-worn device, routing power from multiple body-worn devices that are connected to the body-worn hub via multiple wired connections to the body-worn device to charge the battery in the body-worn device when the battery charge levels of the multiple body-worn devices are sufficient to charge the battery of the body-worn device.

11. The body-worn hub of claim 10, wherein the additional battery charge level of the additional body-worn device is determined to be sufficient to charge the battery in the body-worn device when the additional battery charge level is above an additional battery charge level threshold.

12. The body-worn hub of claim 10, wherein the plurality of actions further comprise, in response to determining that the additional battery charge level of the additional body-worn device and the battery charge levels of the multiple body-worn devices are insufficient to charge the battery of the body-worn device:
generating an event notification indicating that the battery charge level of the battery in the body-worn device is at or below the battery charge level threshold; and
sending the event notification to the body-worn device or another body-worn device for presentation.

13. The body-worn hub of claim 10, wherein the battery charge levels of the multiple body-worn devices are sufficient to charge the battery of the body-worn device when a corresponding battery charge level of each body-worn device of the multiple body-worn devices is above a corresponding battery level threshold.

14. The body-worn hub of claim 10, wherein the routing power from the additional body-worn device includes routing the power from the additional body-worn device until an earlier of the battery in the body-worn device being charged to another battery charge level that is higher than the battery charge level or the battery charge level of the additional body-worn device has dropped to a corresponding battery charge level threshold.

15. The body-worn hub of claim 10, wherein the routing power from the multiple body-worn devices includes routing the power from the multiple body-worn devices until an earlier of the battery in the body-worn device being charged to another battery charge level that is higher than the battery charge level or each of the multiple body-worn devices has its battery charge level percentage value or battery reserve value drops to a corresponding operational battery charge level percentage threshold value or battery reserve threshold value.

16. The body-worn hub of claim 10, wherein the body-worn hub further comprises a first short-range wireless transceiver and the body-worn device includes a second short-range wireless transceiver, and wherein the acts further comprise:
exchanging communication between the body-worn hub and the body-worn device via a short-range wireless connection established using the first short-range wireless transceiver and the second short-range wireless transceiver;
terminating the short-range wireless connection between the body-worn hub and the body-worn device when the wired connection is established between the body-worn hub and the body-worn device;
receiving one or more event notifications from the body-worn device at or below the body-worn hub via the wired connection;
sending one or more commands from the body-worn hub to the body-worn device via the wired connection to trigger the body-worn device to perform one or more actions; and
reestablishing the short-range wireless connection between the body-worn hub and the body-worn device when the wired connection between the body-worn hub and the body-worn device is terminated.

17. The body-worn hub of claim 16, wherein the plurality of actions further comprise generating the one or more commands via an event handler of the body-worn hub based on at least one of the one or more event notifications from the body-worn device, one or more first additional event notifications from one or more other body-worn devices connected to the body-worn hub, one or more second additional event notification from one or more other hubs connected to the body-worn hub, or one or more third event additional notifications from a server of a network operations center (NOC).

18. The body-worn hub of claim 16, wherein the plurality of actions further comprise sending the one or more event notifications from the body-worn device to at least one of a vehicle hub of a law enforcement vehicle or a server of a network operations center (NOC).

19. The body-worn hub of claim 16, wherein the one or more commands are generated by an additional hub connected to the body-worn hub or a server of a network operations center (NOC).

20. A computer-implemented method, comprising:
exchanging communication between a body-worn hub and a body-worn device via a short-range wireless connection established using a first short-range wireless transceiver of the body-worn hub and a second short-range wireless transceiver of the body-worn device;
terminating the short-range wireless connection between the body-worn hub and the body-worn device when a wired connection is established between the body-worn hub and the body-worn device;

receiving one or more event notifications from the body-worn device at the body-worn hub via the wired connection;

sending one or more commands from the body-worn hub to the body-worn device via the wired connection to trigger the body-worn device to perform one or more actions; and reestablishing the short-range wireless connection between the body-worn hub and the body-worn device when the wired connection between the body-worn hub and the body-worn device is terminated.

* * * * *